United States Patent
Leader et al.

(10) Patent No.: US 10,493,743 B2
(45) Date of Patent: Dec. 3, 2019

(54) APPARATUS AND METHOD FOR APPLICATION OF STICKY BACK MATERIAL

(71) Applicant: Leader Engineering-Fabrication, Inc., Napoleon, OH (US)

(72) Inventors: Charles B. Leader, Napoleon, OH (US); Michael J. Manzella, Toledo, OH (US); Rusty L. Schaffner, Wauseon, OH (US)

(73) Assignee: Leader Engineering-Fabrication, Inc., Napoleon, OH (US)

( * ) Notice: Subject to any disclaimer, the term of this patent is extended or adjusted under 35 U.S.C. 154(b) by 118 days.

(21) Appl. No.: 15/605,979

(22) Filed: May 26, 2017

(65) Prior Publication Data
US 2017/0259553 A1    Sep. 14, 2017

Related U.S. Application Data

(62) Division of application No. 14/337,550, filed on Jul. 22, 2014, now Pat. No. 9,662,871.

(60) Provisional application No. 61/857,000, filed on Jul. 22, 2013.

(51) Int. Cl.
| | | |
|---|---|---|
| B32B 41/00 | (2006.01) | |
| B32B 37/00 | (2006.01) | |
| B32B 38/00 | (2006.01) | |
| B65H 35/00 | (2006.01) | |
| B41F 27/00 | (2006.01) | |
| B41N 6/00 | (2006.01) | |
| B41F 27/12 | (2006.01) | |
| B65H 35/02 | (2006.01) | |

(52) U.S. Cl.
CPC .......... *B32B 41/00* (2013.01); *B32B 37/0053* (2013.01); *B32B 38/0004* (2013.01); *B41F 27/005* (2013.01); *B41F 27/12* (2013.01); *B41F 27/1275* (2013.01); *B41N 6/00* (2013.01); *B65H 35/006* (2013.01); *B65H 35/0013* (2013.01); *B65H 35/02* (2013.01); *Y10T 156/1062* (2015.01); *Y10T 156/1077* (2015.01); *Y10T 156/1322* (2015.01); *Y10T 156/1744* (2015.01)

(58) Field of Classification Search
None
See application file for complete search history.

(56) References Cited

U.S. PATENT DOCUMENTS

| | | |
|---|---|---|
| 3,616,055 A | 10/1971 | Mages |
| 4,613,395 A | 9/1986 | Hasegawa |
| 4,925,506 A | 5/1990 | Baker |
| 5,065,677 A | 11/1991 | Leader, Jr. |
| 5,132,911 A | 7/1992 | Leader, Jr. et al. |
| 5,275,681 A | 1/1994 | Hettler |

(Continued)

*Primary Examiner* — Linda L Gray
(74) *Attorney, Agent, or Firm* — Jacob M. Ward; Ward Law Office LLC

(57) ABSTRACT

An automatic applicator of a sticky back material to a printing sleeve is disclosed. The applicator includes a controller that is programmable with data relating to the size and desired positioning of the sticky back material to the sleeve. The sticky back material is secured to a transport system and cut to the desired size by a cutter, creating a sheet. The sheet is then transported between a pressure roller and the sleeve. The pressure roller applies pressure to the sticky back sheet, applying the sheet to the sleeve. A mandrel grips and rotates the sleeve to apply the sticky back sheet around an exterior surface of the sleeve.

17 Claims, 5 Drawing Sheets

(56) References Cited

U.S. PATENT DOCUMENTS

| | | |
|---|---|---|
| 5,647,193 A | 7/1997 | Weder et al. |
| 6,823,793 B2 | 11/2004 | Dewitte |
| 2001/0020433 A1 | 9/2001 | Burton et al. |
| 2004/0020585 A1 | 2/2004 | Hubbard et al. |
| 2009/0127236 A1 | 5/2009 | Hong et al. |
| 2009/0205520 A1 | 8/2009 | Schafer et al. |
| 2011/0061787 A1 | 3/2011 | Cummins et al. |
| 2012/0318429 A1 | 12/2012 | Otten |

APPARATUS AND METHOD FOR APPLICATION OF STICKY BACK MATERIAL

CROSS-REFERENCE TO RELATED APPLICATIONS

This application is a divisional of U.S. patent application Ser. No. 14/337,550, filed on Jul. 22, 2014, and issued as U.S. Pat. No. 9,662,871 on May 30, 2017, which in turn claims the benefit of U.S. Provisional Application Ser. No. 61/857,000, filed on Jul. 22, 2013. The entire disclosures of the above applications are hereby incorporated herein by reference.

FIELD

The present disclosure relates to an apparatus for the automated cutting and application of a sticky back material to a printing sleeve used in a flexographic printing.

BACKGROUND

Flexographic printing involves the use of a flexible printing plate that must first be mounted on a printing cylinder or a cylindrical printing sleeve through the use of sticky back material. The sticky back material is generally a double-sided adhesive sheet that is often packaged as a roll of the sticky back material. Traditionally, the sticky back sheet is mounted to the printing sleeve through manual manipulation of the sheet, the sleeve, and potentially the components used to secure the sleeve within the flexographic printer. An operator may also be required to manually measure and orient the materials when locating the sticky back sheet at a desired position on the sleeve. These manually operated steps often lead to the sticky back sheet being misaligned or improperly applied to the sleeve. Additionally, manual application significantly increases the time and effort required to complete the application process.

One significant problem introduced by manual manipulation and application of the sticky back sheet is that the interface between the sticky back sheet and the printing sleeve may develop air bubbles if the sticky back sheet is not evenly applied. The air bubbles may in turn disturb the flexible printing plate mounted on the sticky back sheet, causing the resultant print quality to suffer. Additionally, manual application of the sticky back material may present health concerns to a person applying the sticky back, including the development of carpal tunnel syndrome in some cases. These limitations may lead to reduced output and an unsatisfactory product.

It would therefore be desirable to have an applicator for sticky back material that automatically cuts a sheet of sticky back material and applies the sheet to a printing sleeve based on data that is input into the applicator prior to operation of the applicator.

SUMMARY

In concordance with the instant disclosure, an automatic sticky back applicator that cuts a sheet of sticky back material and applies the sheet to a printing sleeve, has surprisingly been discovered.

In an embodiment of the current disclosure, an automated applicator of a sticky back material, comprising: a controller; a frame; a transport system including a plurality of clamps and a sliding tube, the sliding tube slidably disposed on the frame, wherein the plurality of clamps are configured to selectively and releasably grip a sheet of the sticky back material and the sliding tube; a cutter to cut the sticky back material at predetermined locations; a pressure roller to apply the sheet of sticky back material to a printing sleeve; and a mandrel configured to grip the sleeve and selectively rotate the sleeve during application of the sheet of sticky back material.

The current disclosure also discloses a method of automatically applying a sticky back material to a printing sleeve, the method comprising: loading a roll of sticky back material onto a loading shaft; feeding the sticky back material to a transport system; clamping the sticky back material at predetermined locations; cutting the sticky back material into at least one sheet using a cutter; gripping a printing sleeve with a mandrel; causing a pressure roller to apply the at least one sheet to a printing sleeve; and rotating the mandrel to cause the sleeve to rotate, applying the sheet to the sleeve.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
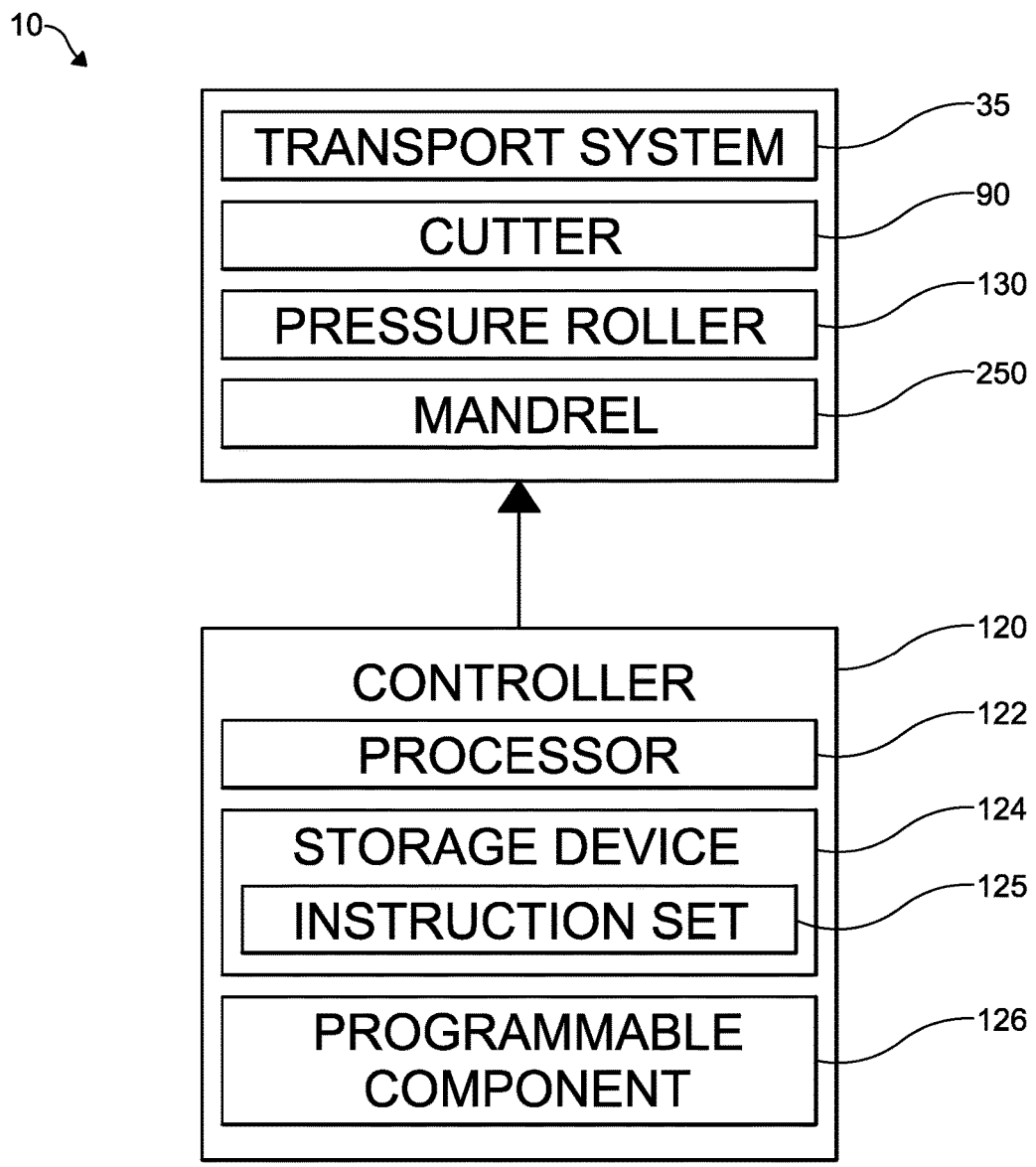
FIG. 1 is a schematic flow diagram of an automatic applicator according to an embodiment of the present disclosure.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. In respect of the methods disclosed, the steps presented are exemplary in nature, and thus, the order of the steps is not necessary or critical.

FIGS. 1-5 show an applicator 10 for the automated application of a sticky back material 100 to a cylindrical printing sleeve 200. The applicator 10 comprises a frame 20, a loading shaft 30, a transport system 35, a cutter 90, a pressure roller 130, a mandrel 250, and a controller 120. It should be understood that the applicator 10 may also be used to apply the sticky back material 100 directly to a printing cylinder (not shown) or any cylindrical work piece in need of the sticky back material 100, in addition to the printing sleeve 200. Accordingly, all references hereinafter to the printing sleeve 200 may also apply to the use of a printing cylinder.

The applicator 10 and various components thereof are actuated automatically during operation of the applicator 10 by a controller 120. As shown in FIG. 1, the controller 120 controls at least the transport system 35, the cutter 90, the pressure roller 130, and the mandrel 250. The controller 120 comprises a processor 122, a storage device 124, and a programmable component 126. The storage device 124 may be a computer memory including a tangible non-transitory computer readable-medium, on which instructions for execution by the processor 122 may be embodied. The programmable component 126 is in communication with the processor 122. The programmable component 126 provides a means for an operator to actively manage the operation of the processor 122 and thereby control the applicator 10. It is understood that the programmable component 126 may store data and information on the storage device 124 and retrieve data and information from the storage device 124.

The operator inputs data to the programmable component 126 to be stored by the storage device 124. The data may include a width of a provided sticky back material roll 110, a desired length of each sheet of sticky back material 100 to be cut, a number of sleeves 200 that the process must be repeated for, the size of the sleeve 200 being used, and information regarding a positioning of each respective sheet of sticky back material 100 on the sleeve 200. Alternatively, the controller 120 may download all needed parameters from an external memory source, as desired. The storage device 124 also stores an instruction set 125. The processor 122 analyzes the data input by the operator using the instruction set 125 to produce a plurality of control signals. The controller 120 then communicates the plurality of control signals to the components of the applicator 10, resulting in automated application of the sticky back material 100 to the sleeve 200.

Figure 2:
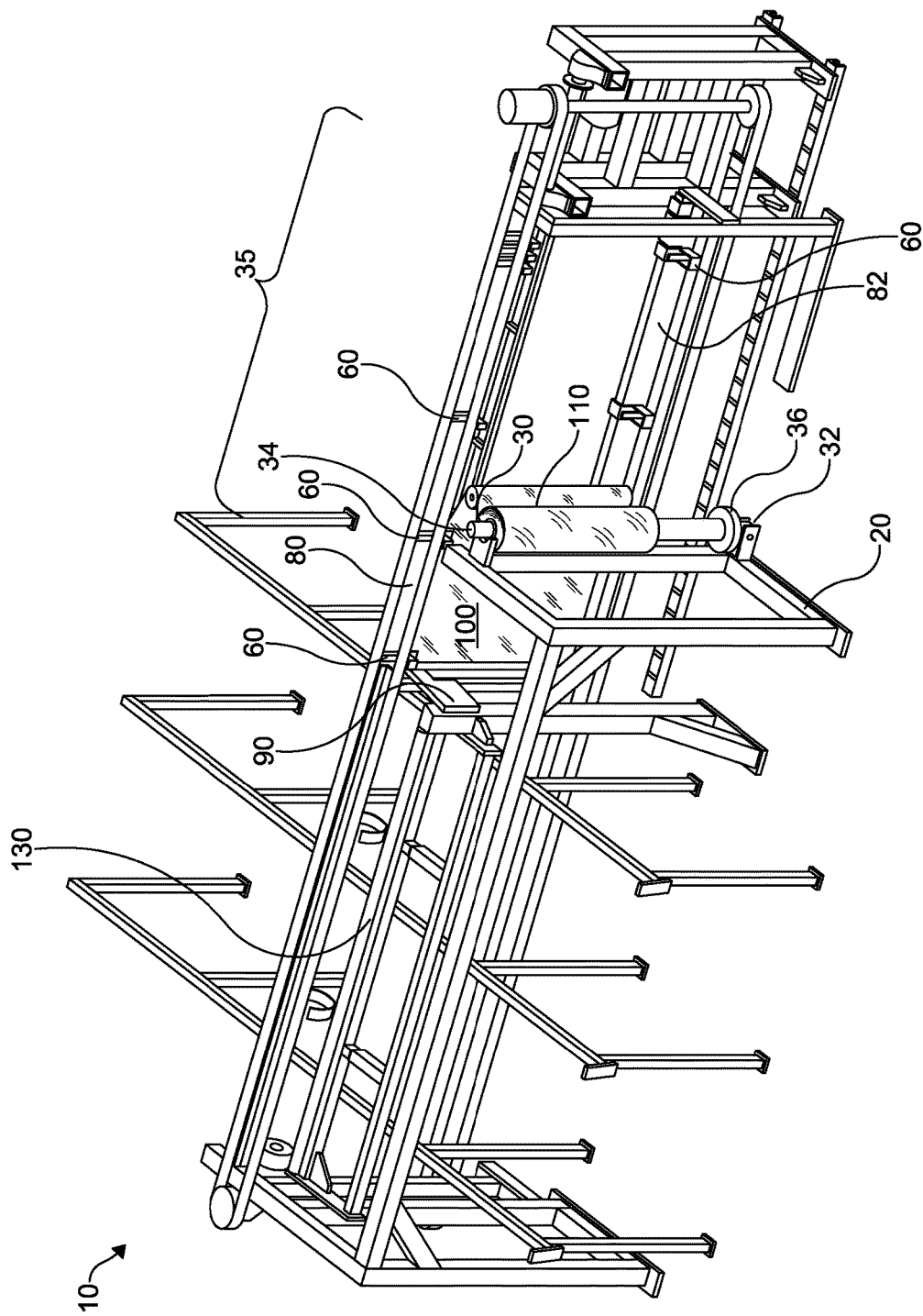
FIG. 2 is a front perspective view of an automatic applicator according to an embodiment of the present disclosure.

As shown in FIG. 2, the loading shaft 30 retains the sticky back material roll 110. The loading shaft 30 is rotatably coupled to the frame 20 of the applicator 10 at a first end 32 to allow the loading shaft 30 to be rotated into a position facilitating a manual loading of the material roll 110. A second end 34 of the loading shaft 24 is dimensioned to receive the material roll 110 thereon. A spacer 36 may be positioned on the loading shaft 30 prior to a loading of the material roll 110 to accommodate various sizes of material rolls 110. Alternatively, the loading shaft 30 may include an adjustable stopper (not shown) or other similar device configured to allow the loading shaft 30 to receive variable sizes of material rolls 110 without the use of the spacer 36.

Once the material roll 110 has been loaded onto the loading shaft 30, a stopper 38 (shown in FIG. 3) is placed over the second end 34 of the loading shaft 30 to secure the material roll 110 thereon. The loading shaft 30 is then rotated to a vertical position where the stopper 38 is received in a groove 40 formed in the frame 20 adjacent the first end 32 of the loading shaft 30. The sticky back material 100 is then able to be unrolled from the sticky back roll 110 once the loading shaft 30 is in the vertical position, allowing the sticky back material 100 to be fed into the transport system 35 of the applicator 10.

Figure 3:
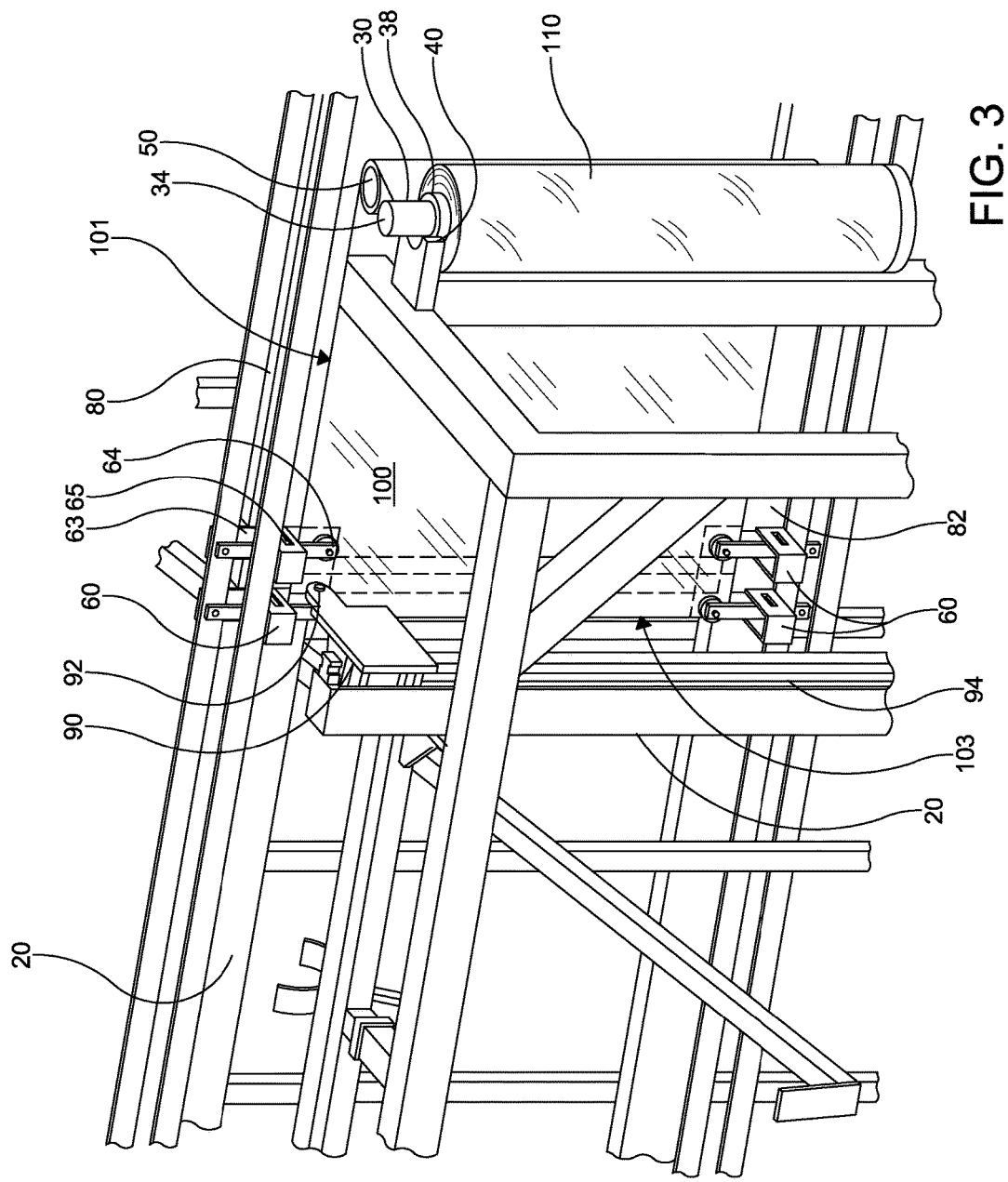
FIG. 3 is a fragmentary front perspective view of the automatic applicator of FIG. 2 showing a loading and a feeding of a sticky back material into the applicator.

Adjacent the loading shaft 30 is a vertically oriented alignment roller 50. As shown in FIG. 3, the sticky back material 100 is unrolled from the material roll 110 and fed around the alignment roller 50. The sticky back material 100 used on the roll 110 includes a film or paper (not shown) disposed on one side thereof, causing the sticky back material 100 to have only one adhesive surface exposed when initially fed into the transport system 35. The side of the sticky back material 100 having the paper or film disposed thereon is in facing relationship with the alignment roller 50. The sticky back material 100 that is fed around the far side of the alignment roller 50 is then substantially aligned with the transport system 35.

Figure 4:
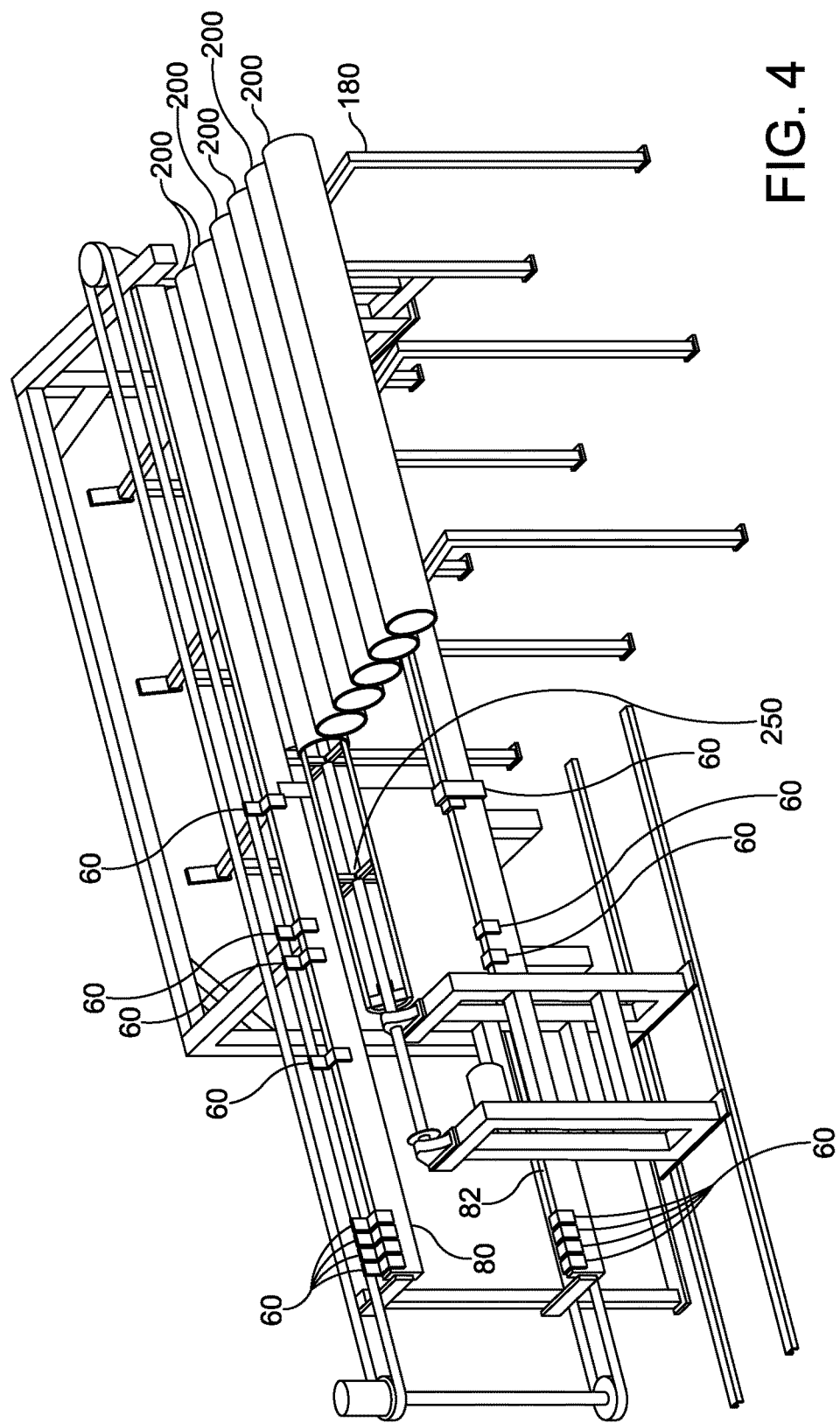
FIG. 4 is a rear perspective view of the automatic applicator of FIG. 2.
Figure 5:
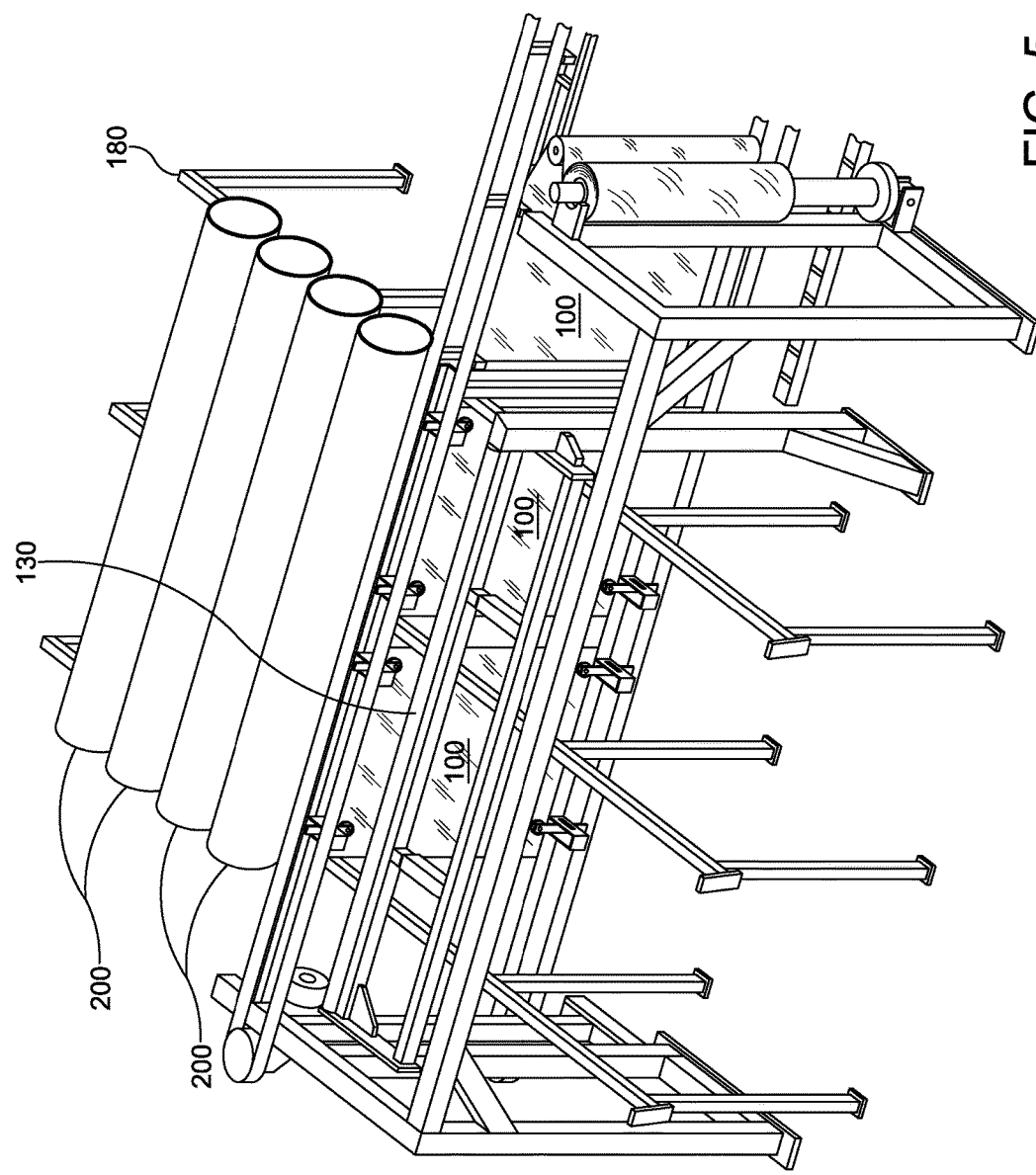
FIG. 5 is a front perspective view the automatic applicator of FIG. 2 showing an application of the sticky back material to a printing sleeve.

The transport system 35 includes a group of components that cooperate to transport the unrolled sticky back material 100 horizontally toward the sleeve 200 (shown in FIGS. 4 and 5). As shown in FIGS. 2-4, the transport system 35 includes an upper sliding tube 80 and a vertically spaced lower sliding tube 82. Each of the sliding tubes 80, 82 is slidably disposed on a horizontally oriented portion of the frame 20, respectively. The sliding tubes 80, 82 are caused to slide horizontally along the frame 20 by an actuator such as a belt system, for example. Each of the sliding tubes 80, 82 further includes a plurality of clamps 60 slidably disposed thereon. Each clamp 60 slidably disposed on the upper sliding tube 80 has a corresponding clamp 60 slidably disposed on the lower sliding tube 82 to cooperate therewith in securely clamping the sticky back material 100 on both sides, forming a plurality of pairs of the clamps 60.

Each of the clamps 60 comprises a body 63, a gripping element 64, and an actuator 65. The body 63 of each clamp 60 at least partially surrounds and receives the sliding tube 80, 82 associated with that clamp 60, causing each of the clamps 60 to be slidable in a direction parallel to the longitudinal axes of the sliding tubes 80, 82. This arrangement allows each of the clamps 60 to move relative to its associated sliding tube 80, 82 while each sliding tube 80, 82 is allowed to move relative to the stationary frame 20. Furthermore, each of the clamps 60 is configured to be selectively and releasably coupled to its associated sliding tube 80, 82 as the clamps 60 are moved relative to the sliding tubes 80, 82. Each of the clamps 60 may include a means of gripping the associated sliding tube 80, 82 included within the body 63 thereof. For instance, the portion of the body 63 that at least partially surrounds the associated sliding tube 80, 82 may be configured to compress around the associated sliding tube 80, 82, securing the clamp 60 to the sliding tube 80, 82.

The gripping element 64 may be in the form of a tab that is spaced apart from the body portion 63 when toggled to an open position. The sticky back material 100 that has been wrapped around the alignment roller 50 is positioned to pass between the gripping element 64 and the body portion 63 (shown partly by dashed line in FIG. 3) of each of the clamps 60. The actuator 65 is coupled to the gripping element 64 and selectively causes the gripping element 64 to move toward the body portion 63, compressing and gripping the sticky back material 100 that is positioned therebetween. Accordingly, the clamps 60 are selectively and releasably coupled to the sticky back material 100 as desired. As described hereinabove, it should be understood that each of the clamps 60 slidably disposed on the upper sliding tube 80 is caused to move in unison with a corresponding one of the clamps 60 slidably disposed on the lower sliding tube 82.

It should be understood that the sticky back material 100 has an adhesive surface exposed while being transported by the transport system 35. As such, selected portions of the clamps 60 and the sliding tubes 80, 82 may be formed of a material that the sticky back material 100 will not adhere to when it comes in contact therewith. Alternatively, the components may be coated or treated with a material that prevents the adhesive from adhering to the components.

The controller 120 controls the relative movements of the sliding tubes 80, 82 and the clamps 60 as well as the selective and releasable coupling of the clamps 60 to the sliding tubes 80, 82 and the clamps 60 to the sticky back material 100. The controller 120 uses the data input therein to control the various actuators associated with each device to properly position each of the clamps 60 on the associated sliding tube 80, 82 before moving the sliding tubes 80, 82 and the clamps 60 in unison.

The sticky back material 100 that has been fed around the alignment roller 50 is pulled until the upper edge 101 of the sticky back material 100 is aligned with a designated mark (not shown) on the frame 20. The designated mark is used to align the sticky back material 100 for a first cut to be performed by a cutter 90. Once the sticky back material 100 is properly aligned, the sticky back material 100 is clamped to each side of the cutter 90 using the clamps 60. A first pair of the clamps 60 grips the sticky back material 100 adjacent a first edge 103 thereof while a second pair of the clamps 60 grips the sticky back material 100 a distance spaced apart from the first edge 103. The cutter 90 is then aligned to perform a cut between the first pair of clamps 60 and the second pair of clamps 60. Alternatively, in place of the first pair of clamps 60, the applicator 10 may include a means of clamping the first edge 103 of the sticky back material 100 that is permanently affixed to the frame 20 adjacent the designated mark. The permanently affixed means of clamping may then cooperate with an adjacent pair of the clamps 60 to perform a cut therebetween.

The cutter 90 is disposed adjacent and spaced apart from the unrolled sticky back material 100 when the material 100 is initially retained by the clamps 60. The cutter 90 may be slidably disposed on a track system 94 formed as a vertically arranged portion of the frame 20. It should be understood that any method of causing linear vertical displacement may be used, including use of a conveyer system, pulley, belt, and the like. The cutter 90 may also include a cutter blade 92. The cutter blade 92 may be slidably disposed on the cutter 90 in a horizontal direction to allow the cutter blade 92 to retract from the sticky back material 100 when a cut is not being performed or to engage the sticky back material 100 during a cutting operation. The vertical motion of the cutter 90 and the horizontal motion of the cutter blade 92 are each controlled by the controller 120.

Once properly aligned and clamped into place, the sticky back material 100 is ready to undergo a first cut. The cutter 90 is activated, causing the cutter blade 92 to be moved horizontally until a cut is begun. The cutter 90 is then translated vertically until a strip of the material 100 is separated from the remaining sticky back material 100, causing the remaining sticky back material 100 to have a straight and properly aligned lead-in edge. The strip of material 100 that has been separated, including the first edge 103, is released from the trailing edge pair of clamps 60 and is removed by the operator.

Referring now to FIG. 4, the at least one printing sleeve 200 is loaded by the operator onto a feed ramp 180. The feed ramp 180 is an angled surface for gravity feeding the at least one sleeve 200 into a position for receiving the sticky back material 100. The feed ramp 180 is configured to bring a first one of the at least one sleeve 200 to rest in a predetermined position. The at least one sleeve 200 is then ready to be further positioned by the mandrel 250.

The mandrel 250 is slidably disposed on a portion of the frame 20 aligned parallel to the sliding tubes 80, 82. The controller 120 causes the mandrel 250 to slide toward the sleeve 200 in the predetermined position while the mandrel 250 is in a contracted position, allowing a hollow interior of the sleeve 200 to receive the mandrel 250. Once fully received, the mandrel 250 is then caused to expand and securely grasp the sleeve 200. The mandrel 250 is coupled to an actuator (not shown) that causes the mandrel 250 to rotate about a longitudinal axis thereof. It should be understood that any method of gripping and rotating the sleeve 200 may be used in place of the mandrel 250.

Referring now to FIG. 5, adjacent the sleeve 200 is a pressure roller 130. The pressure roller 130 is coupled to an actuator (not shown) that causes the pressure roller 130 to move horizontally toward the sleeve 200. The pressure roller 130 and the sleeve 200 cooperate to sandwich any sticky back material 100 that has been transported therebetween by the transport system 35. The pressure roller 130 applies enough pressure during an application process to evenly apply the sticky back material 100 to the sleeve 200 while militating against the formation of air bubbles. As the pressure roller 130 applies pressure to the sticky back material 100 the mandrel 250 causes the sleeve 200 to rotate, applying the sticky back material 100 to an exterior surface of the sleeve 200. Once the sticky back material 100 has been applied, the pressure roller 130 may be retracted to allow the sleeve 200 to continue down the feed ramp 180 to a designated area for the sleeves 200 that have received the sticky back material 100.

In use, an operator first inputs the data relating to the dimensions of the sticky back material 100, the dimensions of the sleeve 200, and the number of times to repeat the process to the controller 120. The operator then loads the roll 110 of sticky back material 100 onto the loading shaft 30 and feeds the material 100 around the alignment roller 50 and toward the transport system 35. The operator then secures the sticky back material 100 to a first pair and a second pair of the clamps 60. Next, the cutter 90 is activated to perform the first cut between the first and second pairs of the clamps 60, forming a straight edge. The first pair of clamps 60 are released, leaving the remaining sticky back material 100 to be gripped by a single pair of the clamps 60. As described hereinabove, the cut may also take place between a permanent means of clamping the sticky back material 100 and a single pair of the clamps 60. The sticky back material 100 is gripped by a single pair of the clamps 60 at this stage in either case. Any excess sticky back material 100 is removed by the operator.

The pair of clamps 60 still gripping the sticky back material 100 is then activated by the controller 120 to rigidly couple the pair of clamps 60 to the sliding tubes 80, 82. This causes the sticky back material 100, the pair of clamps 60, and the sliding tubes 80, 82 to all move in unison as the sliding tubes 80, 82 are caused to move the sticky back material 100 toward the sleeve 200. As described hereinabove, any remaining pairs of the clamps 60 disposed downstream of the pair of the clamps 60 gripping the sticky back material 100 may move relative to the sliding tubes 80, 82, which in turn may move relative to the stationary frame 20. As such, the sliding tubes 80, 82 (with the gripping pair of the clamps 60 rigidly attached thereto) move relative to a pair of the clamps 60 adjacent the gripping pair of the clamps 60. This causes a separation of the gripping pair of the clamps 60 from the adjacent pair of the clamps 60. This separation continues until the controller 120 determines that the proper distance between the pairs of the clamps 60 is achieved based on the data input by the operator. The adjacent pair of the clamps 60 is then activated to couple the adjacent pair of the clamps 60 to both the sticky back material 100 and the sliding tubes 80, 82. The sticky back material 100 is then gripped at four distinct locations by two distinct pairs of the clamps 60. The four locations are associated with four corners of a sheet of the sticky back material 100 that will be applied to the sleeve 200. The sheet of sticky back material 100 is then cut from the unrolled material 100 by coupling a third pair of clamps 60 thereto and activating the cutter 90 to perform a cut between the third pair of the clamps 60 and the adjacent pair of the clamps 60. As described hereinabove, the positioning of the pairs of the clamps 60 and the sliding tubes 80, 82 is achieved by the controller 120 through analysis of the data input by the operator.

In some instances, it may be desired to apply a second sheet of the sticky back material 100 to a single sleeve 200, as shown in FIG. 5. In such cases the first sheet of the sticky back material 100 that has been separated from the remainder of the roll 110 is caused to move in unison with the sliding tubes 80, 82 and the pairs of clamps 60 gripping the sheet until a predetermined separation is achieved between the sheet and the remaining sticky back material 100, as based on the data input into the controller 120 by the operator. The remaining sticky back material 100 is still gripped by the third pair of the clamps 60. The third pair of the clamps 60 is then caused to rigidly grip the sliding tubes 80, 82. The sticky back material 100 is then pulled further until a fourth pair of the clamps 60 grips both the material 100 and the sliding tubes 80, 82 at locations predetermined by the data input to the controller 120. A fifth pair of the clamps 60 then grips the sticky back material 100 adjacent the fourth pair of the clamps 60 for the cutter 90 to perform another cut therebetween. This process may be repeated depending on the desired number of sheets of the sticky back material 100 to be applied to a single sleeve 200, as input to the controller 120.

The sheet or sheets of the sticky back material 100 that have been cut and secured by the transport system 35 are then transported toward the sleeve 200. The sliding tubes 80, 82 move the sheets of the sticky back material 100 to a predetermined location relative to the sleeve 200 based on the data input to the controller 120. The pressure roller 130 is then caused to move toward the sheets of the sticky back material 100, sandwiching the sheets between the pressure roller 130 and the mandrel 250. The sleeve 200 is caused to rotate by the mandrel 250 to first apply the upper edge 101 of the sheet to the sleeve 200. The sleeve 200 is then caused to rotate in a reverse direction to apply a remaining portion of the sheet plus an overlay to be cut-off by the operator. All pairs of the clamps 60 are released at the proper time to ensure that the sticky back material 100 is able to be wound about the sleeve 200. The mandrel 250 is then reduced in size and pulled out of the sleeve 200, releasing the sleeve 200. The sleeve 200 may then continue down the feed ramp 80 until the sleeve 200 has reached a portion of the feed ramp 80 designated for sleeves 200 having the sticky back material 100 applied thereto. The process is then repeated depending on the number of sleeves 200 input by the operator to the controller 120.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A method of automatically applying a sticky back material to a printing sleeve, the method comprising the step of:

providing an automated applicator for the sticky back material, the automated applicator including a controller, a frame, a transport system including a pair of spaced apart sliding tubes and a plurality of clamps, the sliding tubes slidably disposed on the frame, and the clamps slidably disposed on the sliding tubes, wherein the clamps are configured to selectively and releasably grip a sheet of the sticky back material and the sliding tubes, the cutter is configured to cut the sticky back material at predetermined locations, a pressure roller is configured to apply the sheet of sticky back material to the printing sleeve, and a mandrel is configured to grip the sleeve and selectively rotate the sleeve during application of the sheet of sticky back material;

loading a roll of sticky back material onto a loading shaft;

feeding the sticky back material to the transport system;

clamping the sticky back material at a plurality of the predetermined locations;

cutting the sticky back material into the at least one sheet using the cutter;

gripping the printing sleeve with the mandrel;

causing the pressure roller to move and sandwich a portion of the at least one sheet between the pressure roller and the printing sleeve; and rotating the mandrel to cause the sleeve to rotate, thereby applying the at least one sheet to the sleeve.

2. The method of claim 1, wherein the controller includes a processor, a storage device with an instruction set in communication with the processor, and a programmable component in communication with the processor.

3. A method of automatically applying a sticky back material to a printing sleeve, the method comprising the step of:

loading a roll of sticky back material onto a loading shaft;

feeding the sticky back material to a transport system;

clamping the sticky back material at a plurality of predetermined locations;

cutting the sticky back material into at least one sheet using a cutter;

gripping the printing sleeve with a mandrel;

causing a pressure roller to move and sandwich a portion of the at least one sheet between the pressure roller and the printing sleeve; and rotating a mandrel to cause the sleeve to rotate, thereby applying the at least one sheet to the sleeve, wherein the loading shaft is rotatable from a non-vertical position permitting a manual loading of the roll of the sticky back material onto the loading shaft to a vertical position permitting a feeding of the sticky back material into the transport system.

4. The method of claim 3, wherein a second end of the loading shaft has a removable stopper to selectively secure the roll of the sticky back material onto the loading shaft.

5. The method of claim 1, wherein the frame includes a vertically oriented alignment roller disposed adjacent the roll of the sticky back material and configured to receive the sticky back material having a paper or film disposed thereon, the paper or film being in a facing relationship with the alignment roller, and to align the stick back material with the transport system.

6. The method of claim 1, wherein the pair of sliding tubes includes an upper sliding tube and a lower sliding tube, each of the clamps disposed on the upper sliding tube having a corresponding one of the clamps disposed on the lower sliding tube.

7. The method of claim 1, wherein each of the clamps has a body, a gripping element, and an actuator.

8. The method of claim 7, wherein the body at least partially surrounds and receives an associated one of the sliding tubes.

9. The method of claim 7, wherein the body of each of the clamps is configured to compress around an associated one of the sliding tubes to couple each the of the clamps to the associated one of the sliding tubes.

10. The method of claim 7, wherein the gripping element includes a tab that is spaced apart from the body in an open position, and which by the actuator moves toward the body in a closed position for gripping the sticky back material positioned therebetween.

11. The method of claim 1, wherein the cutter is slidably disposed on a track system formed as a vertically arranged portion of the frame.

12. The method of claim 11, wherein the cutter includes a cutter blade slidably disposed on the cutter in a horizontal direction to allow the cutter blade to one of retract from the sticky back material when a cut is not being performed and engage the sticky back material during a cutting operation.

13. The method of claim 1, further including a feed ramp disposed adjacent the frame and configured to receive the printing sleeve, the feed ramp having an angled upper surface for gravity feeding the printing sleeve into a position for receiving the sheet of the sticky back material.

14. The method of claim 1, wherein the mandrel is slidably disposed on a portion of the frame aligned parallel to the sliding tubes.

15. A method of automatically applying a sticky back material to a printing sleeve, the method comprising the step of:
loading a roll of sticky back material onto a loading shaft;
feeding the sticky back material to a transport system;
clamping the sticky back material at a plurality of predetermined locations;
cutting the sticky back material into at least one sheet using a cutter;
gripping the printing sleeve with a mandrel;
causing a pressure roller to move and sandwich a portion of the at least one sheet between the pressure roller and the printing sleeve; and
rotating a mandrel to cause the sleeve to rotate, thereby applying the at least one sheet to the sleeve,
wherein the mandrel is configured to move from a contracted position for insertion into a hollow interior of the printing sleeve and an expanded position for securely gripping the sleeve.

16. The method of claim 1, wherein the mandrel is rotatable about a longitudinal axis of the mandrel.

17. The method of claim 1, wherein the pressure roller is movably attached to the frame, the pressure roller movable horizontally toward the printing sleeve for the sandwiching of the sheet of the sticky back material between the pressure roller and the printing sleeve, and the pressure roller movable horizontally away from the printing sleeve to allow the printing sleeve to move by the pressure roller to a designated area.

* * * * *